(12) United States Patent
Nguyen et al.

(10) Patent No.: US 10,012,065 B2
(45) Date of Patent: Jul. 3, 2018

(54) HYDROPHOBIC SURFACE TREATMENT FOR USE IN SUBTERRANEAN FORMATION OPERATIONS

(71) Applicant: Halliburton Energy Services, Inc., Houston, TX (US)

(72) Inventors: Philip D. Nguyen, Houston, TX (US); Ali Alwattari, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/312,871

(22) PCT Filed: Aug. 15, 2014

(86) PCT No.: PCT/US2014/051348
§ 371 (c)(1),
(2) Date: Nov. 21, 2016

(87) PCT Pub. No.: WO2016/025004
PCT Pub. Date: Feb. 18, 2016

(65) Prior Publication Data
US 2017/0190961 A1    Jul. 6, 2017

(51) Int. Cl.
*E21B 43/267* (2006.01)
*C09K 8/80* (2006.01)
*E21B 43/26* (2006.01)

(52) U.S. Cl.
CPC ............ *E21B 43/267* (2013.01); *C09K 8/805* (2013.01); *E21B 43/26* (2013.01)

(58) Field of Classification Search
None
See application file for complete search history.

(56) References Cited

U.S. PATENT DOCUMENTS 4,183,814 A    1/1980  Ramachandran
4,716,051 A   12/1987  Rodder
(Continued)

FOREIGN PATENT DOCUMENTS

EP    2634162 A1     9/2013
WO   2008131540 A1  11/2008
WO   2011086012 A1   7/2011

OTHER PUBLICATIONS

Santiago, J. Sol-Gel Sci Technol (2012) 61:8-13.
(Continued)

*Primary Examiner* — Anuradha Ahuja
(74) *Attorney, Agent, or Firm* — McDermott Will & Emery LLP

(57) ABSTRACT

Methods including preparing a silanization composition comprising an aqueous base fluid and an alkyltrialkoxysilane; coating the silanization composition at least partially onto proppant particulates, thereby forming coated proppant particulates, wherein the silanization composition imparts hydrophobicity to the proppant particulates; and introducing the coated proppant particulates into a subterranean formation. The alkyltrialkoxysilane in the silanization composition may have the formula $R^1(OR^2)_3Si$, where $R^1$ is a $C_8$ to $C_{22}$ alkyl chain and $R^2$ is an alkyl group selected from the group consisting of methyl, ethyl, butyl, tert-butyl, isopropyl, and any combination thereof.

18 Claims, 1 Drawing Sheet

(56) References Cited

U.S. PATENT DOCUMENTS

| | | | | |
|---|---|---|---|---|
| 2004/0023818 A1* | 2/2004 | Nguyen | ............... | C09K 8/68 |
| | | | | 507/209 |
| 2005/0244641 A1* | 11/2005 | Vincent | ............... | C09K 8/62 |
| | | | | 428/403 |
| 2010/0163234 A1 | 7/2010 | Fuller et al. | | |
| 2010/0276142 A1 | 11/2010 | Skildum et al. | | |
| 2011/0036577 A1* | 2/2011 | Barmatov | ............ | C09K 8/516 |
| | | | | 166/305.1 |
| 2012/0048554 A1* | 3/2012 | Hughes | ............. | E21B 43/267 |
| | | | | 166/305.1 |
| 2012/0048555 A1* | 3/2012 | Hughes | ............. | E21B 43/267 |
| | | | | 166/305.1 |
| 2012/0048557 A1* | 3/2012 | Hughes | ............... | C09K 8/70 |
| | | | | 166/308.1 |
| 2012/0322697 A1 | 12/2012 | Zhang | | |
| 2012/0328875 A1 | 12/2012 | Schoneveld et al. | | |
| 2014/0034309 A1* | 2/2014 | Saini | ............... | E21B 43/267 |
| | | | | 166/280.1 |

OTHER PUBLICATIONS

Raoush, Environ. Sci. Technol. (2009) 43(13), 4796-4801.
International Search Report and Written Opinion for PCT/US2014/051348 dated Apr. 13, 2015.

\* cited by examiner

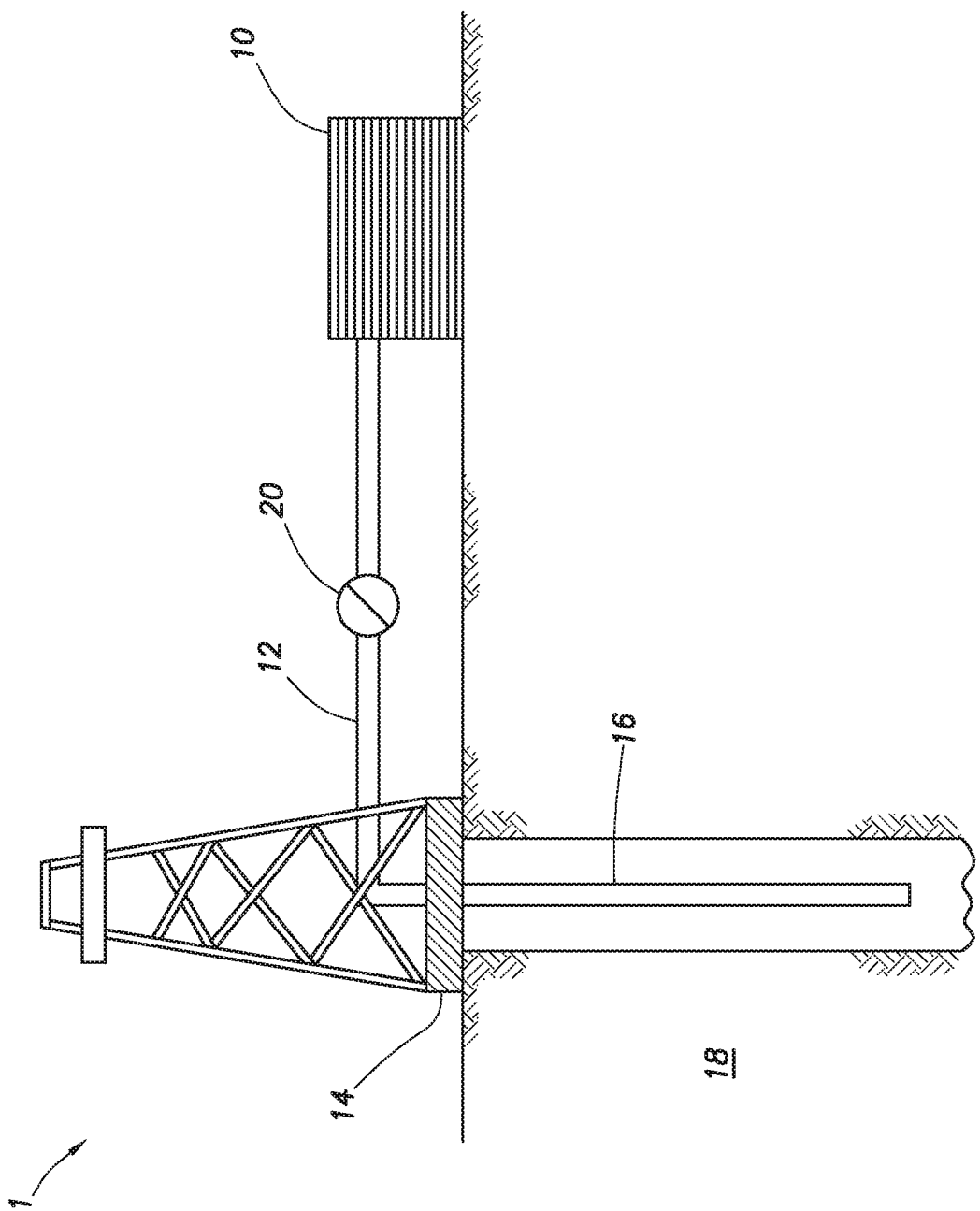

HYDROPHOBIC SURFACE TREATMENT FOR USE IN SUBTERRANEAN FORMATION OPERATIONS

BACKGROUND

The embodiments herein relate generally to subterranean formation operations and, more particularly, to treatment compositions and methods to impart hydrophobic properties to surfaces.

Subterranean wells (e.g., hydrocarbon producing wells, water producing wells, and the like) are often stimulated by hydraulic fracturing treatments. In hydraulic fracturing treatments, a gelled treatment fluid is often pumped into a portion of a subterranean formation at a rate and pressure such that the subterranean formation breaks down and one or more fractures are formed therein. Particulate solids, such as graded sand, are typically suspended in at least a portion of the treatment fluid and deposited into the fractures in the subterranean formation. These particulate solids, or "proppant particulates" (also referred to simply as "proppants") serve to prop the fracture open (e.g., keep the fracture from fully closing) after the hydraulic pressure is removed. By keeping the fracture from fully closing, the particulates aid in forming conductive paths through which produced fluids, such as hydrocarbons, may flow.

The degree of success of a fracturing operation depends, at least in part, upon fracture porosity and conductivity once the fracturing operation is complete and production is begun. Fracturing operations may place a volume of particulates into a fracture to form a "proppant pack" or "gravel pack" (referred to herein as "proppant pack") in order to ensure that the fracture does not close completely upon removing the hydraulic pressure.

At the end of primary recovery operations, the natural driving pressure in a subterranean formation well may be below a pressure sufficient for production, despite a substantial quantity of hydrocarbons remaining in the subterranean formation. In such cases, secondary recovery methods, such as injection operations, may be used to retrieve the remaining hydrocarbons. For example, in typical injection operations the energy for producing the remaining hydrocarbons from the subterranean formation may be supplied by the injection of fluids into the formation under pressure through one or more injection wells penetrating the formation. The injection fluids then drive the hydrocarbons toward one or more producing wells. Typical injection fluids include water, steam, carbon dioxide, and natural gas.

During fracturing and injection operations, the surface of the subterranean formation or the surface of proppant particulates may interfere with fluid recovery or fluid flow therein due to friction or drag forces, porosity, or a hydrophilic property of the surface. For example, load recovery of fracturing fluid and injection water pressures may be reduced due to interaction with the surface of a formation. Diagenesis or scale build up may be increased on the surface of a formation. Additionally, deterioration or proppant particulates or fracture faces may occur, thereby reducing production. In some instances, the use of fluorinated hydrocarbons has been employed to coat the surface of a subterranean formation or the surface of proppant particulates to achieve water-repellency to combat these problems. However, fluorinated hydrocarbons are considered hazardous to the environment and human health.

BRIEF DESCRIPTION OF THE DRAWINGS

The following FIGURE is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the silanization composition and/or silanization composition coated proppant particulates of the embodiments described herein to a downhole location.

DETAILED DESCRIPTION

The embodiments herein relate generally to subterranean formation operations and, more particularly, to treatment compositions and methods to impart hydrophobic properties to surfaces. The treatment compositions described herein are silanization compositions comprising an aqueous base fluid and an alkyltrialkoxysilane that can be coated onto surfaces, such as the surface of a subterranean formation or proppant particulate.

In some embodiments, the methods and compositions described herein may be with reference to hydraulic fracturing operations (e.g., formation of a proppant pack) and injection operations. However, the silanization compositions may be used in any other subterranean formation operation that may benefit from having a hydrophobic coating on one or more surfaces. Such subterranean formation operations may include, but are not limited to, a drilling operation; a stimulation operation; an acidizing operation; an acid-fracturing operation; a sand control operation; a fracturing operation; a frac-packing operation; a remedial operation; a near-wellbore consolidation operation; and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a silanization composition comprising an aqueous base fluid and an alkyltrialkoxysilane. The silanization composition may be coated onto surfaces, such as the surface of a subterranean formation (e.g., a fracture face) or the surface of proppant particulates to impart a hydrophobic property (i.e., water-repellency) to the coated surface. The hydrophobic property of the surface provides a number of advantages in certain subterranean formation operations. For example, the silanization composition coating may enhance load recovery of fracturing fluid after a fracturing treatment, reduce drag forces or fracture pressures during fluid flow (e.g., water flow during a water injection), prevent or minimize diagenesis and scale buildup to maintain fracture conductivity, and prevent or minimize deterioration of proppant particulates or fracture faces to maintain fracture conductivity.

In some embodiments, the silanization composition may be coated at least partially onto proppant particulates, thereby forming coated proppant particulates, wherein the silanization composition imparts hydrophobicity to the proppant particulates. Thereafter, the coated proppant particulates may be introduced into a subterranean formation, such as part of a fracturing operation (i.e., to form a proppant pack in a fracture). For example, the coated proppant particulates may be introduced into the subterranean formation in the silanization composition itself or, in other embodiments, may be included in a treatment fluid comprising a base fluid. The treatment fluid or the silanization composition may be introduced into the subterranean formation after hydraulic fracturing has been performed (e.g., by a pad fluid) or may itself be introduced to create or enhance fracturing by introducing the treatment fluid into the formation above the threshold fracture gradient. As used herein, the term "threshold fracture gradient" refers to the pressure necessary to create or enhance at least one fracture in a subterranean formation.

In other embodiments, the silanization composition may be coated at least partially onto a portion of the surface of a subterranean formation, such as the surface of a fracture face, which may or may not be created or enhanced with a treatment fluid comprising the silanization composition or the silanization composition alone (e.g., fracturing and coating of the surface occurs simultaneously). As used herein, the term "fracture face" refers to a face of a crack or surface of breakage within rock. The subterranean formation may be of any composition that is capable of being coated with the silanization composition including, but not limited to, sandstone (e.g., quartz, kaolinite, feldspar, clay), carbonate, shale, coal beds, sand, limestone, diatomite, chalk, siltstone, gravel, dolostone, mudstone, volcanic rock, combinations thereof, and the like. The coating of the subterranean formation surface (e.g., fracture face surface) causes the coated surface to adopt hydrophobic properties (i.e., water-repellency).

The silanization composition may coat the surface of a subterranean formation and/or proppant particulates, for example, by reacting directly with the surface. For example, in some embodiments, the silanization composition may be coated onto the surface by way of a condensation reaction forming a covalent bond, such as where a functional group of the alkyltrialkoxysilane reacts with hydroxyl groups on the surface of the subterranean formation or proppant particulates to form a siloxane bond (Si—O—Si). Other types of reactions may also be employed to coat the silanization composition onto the surface. In certain embodiments, prior to coating the surface of a subterranean formation or proppant particulates, for example, with the silanization composition, the surface may be first pretreated with tetraethylorthosilicate to facilitate the coating.

The silanization composition may comprise an aqueous base fluid and an alkyltrialkoxysilane. The aqueous base fluid may include, but is not limited to, fresh water, saltwater (e.g., water containing one or more salts dissolved therein), brine (e.g., saturated salt water), seawater, and any combination thereof. Generally, the water may be from any source, provided that it does not contain components that might adversely affect the stability and/or performance of the silanization composition to coat a surface and impart a hydrophobic property thereto.

In some embodiments, the alkyltrialkoxysilane may be an organosilane with the general formula of $R^1(OR^2)_3Si$, where $R^1$ is a $C_8$ to $C_{22}$ alkyl chain and $R^2$ is an alkyl group selected from the group consisting of methyl, ethyl, butyl, tert-butyl, isopropyl, and any combination thereof. Each of the three $R^2$ compounds forming the $(OR^2)_3$ portion of the general formula are identical for a given alkyltrialkoxysilane. Specific examples of suitable alkyltrialkoxysilanes for use in the embodiments described herein may include, but are not limited to, an organosilane selected from the group consisting of hexadecyltrimethoxysilane, isobutyl trimethoxysilane, propyl trimethoxysilane, propyl triethoxysilane, isopropyl trimethoxysilane, isopropyl triethoxysilane, butyl trimethoxysilane, butyl triethoxysilane, isobutyl triethoxysilane, sec butyl trimethoxysilane, sec butyl triethoxysilane, tert butyl trimethoxysilane, tert butyl triethoxysilane, trimethoxysilane, trimethoxymethylsilane, vinyltrimethoxysilane, trimethoxy(3,3,3-trifluoropropyl)silane, allyltrimethoxysilane, (3-bromopropyl)trimethoxysilane, (3-iodopropyl)trimethoxysilane, (3-mercaptopropyl)trimethoxysilane, triethoxysilane, trimethoxy(propyl)silane, (3-aminopropyl)trimethoxysilane, triethoxymethylsilane, trimethoxy[3-(methylamino)propyl]silane, triethoxyvinylsilane, triethoxy(ethyl)silane, [3-(2-aminoethylamino)propyl]trimethoxysilane, N-[3-(trimethoxysilyl)propyl]ethylenediamine, 1,2-bis(trimethoxysilyl)ethane, trimethoxyphenylsilane, allyltriethoxysilane, (3-glycidyloxypropyl)trimethoxysilane, (3-chloropropyl)triethoxysilane, (3-mercaptopropyl)triethoxysilane, n-propyltriethoxysilane, (3-aminopropyl)triethoxysilane, triethoxy-2-thienylsilane, 3-cyanopropyltriethoxysilane, chloromethyltriisopropoxysilane, methyl-tripropoxysilane, [3-(diethylamino)propyl]trimethoxysilane, trimethoxy(2-phenylethyl)silane, trimethoxy[2-(7-oxabicyclo[4.1.0]hept-3-yl)ethyl]silane, cyclopentyltriethoxysilane, trimethoxy(7-octen-1-yl)silane, isooctyl trimethoxysilane, trimethoxy(octyl)silane, (pentafluorophenyl)triethoxysilane, (4-chlorophenyl)triethoxysilane, triethoxyphenylsilane, (3-glycidyloxypropyl)triethoxysilane, (3-chloropropyl)tris(trimethylsiloxy)silane, tetrakis(trimethylsilyloxy)silane, triethoxy-p-tolylsilane, triethoxy(4-methoxyphenyl)silane, 1H,1H,2H,2H-perfluorooctyltriethoxysilane, triethoxy(1-phenylethenyl)silane, triethoxy(octyl)silane, dodecyltriethoxysilane, trimethoxy(octadecyl)silane, n-octadecyltriethoxysilane, methyltris(tri-sec-butoxysilyloxy)silane, and any combination thereof.

In some embodiments, the alkyltrialkoxysilane may be present in the silanization composition in an amount in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5%, encompassing any value and subset therebetween.

In those embodiments where the silanization composition is coated onto proppant particulates, the proppant particulates may be composed of any material capable of being coated with the silanization composition. In some embodiments, the proppant particulates may be a natural or man-made material such as, for example, natural sand, silica, sodium silicate, meta-silicate, calcium silicate, aluminum silicate, ceramic, sintered bauxite, and any combination thereof. The proppant particulates may additionally be of any size and shape combination suitable for the particular subterranean formation operation in which they are being used (e.g., a fracturing operation). Generally, where the chosen proppant particulates are substantially spherical, suitable proppant particulates may have a size in the range of from a lower limit of about 2 mesh, 10 mesh, 20 mesh, 30 mesh, 40 mesh, 50 mesh, 60 mesh, 70 mesh, 80 mesh, 90 mesh, 100 mesh, 110 mesh, 120 mesh, 130 mesh, 140 mesh, 150 mesh, 160 mesh, 170 mesh, 180 mesh, 190 mesh, and 200 mesh to an upper limit of about 400 mesh, 390 mesh, 380 mesh, 370 mesh, 360 mesh, 350 mesh, 340 mesh, 330 mesh, 320 mesh, 310 mesh, 300 mesh, 290 mesh, 280 mesh, 270 mesh, 260 mesh, 250 mesh, 240 mesh, 230 mesh, 220 mesh, 210 mesh, and 200 mesh, U.S. Sieve Series, or even higher, encompassing any value and subset therebetween. In some embodiments of the present disclosure, the proppant particulates may have a size in the range of from about 8 to about 120 mesh, U.S. Sieve Series.

In some embodiments of the present disclosure, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, and any combination thereof. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches ("in"), 0.03 in, 0.04 in, 0.05 in, 0.06 in, 0.07 in, 0.08 in, 0.09 in, 0.1 in, 0.11 in, 0.12 in, 0.13 in, 0.14 in, and 0.15 in to an upper limit of about 0.3 in, 0.29 in, 0.28 in, 0.27 in, 0.26 in, 0.25 in, 0.24 in, 0.23 in, 0.22 in, 0.21 in, 0.2 in, 0.19 in, 0.18 in, 1.17 in, 0.16 in, and 0.15 in, in length, encompassing any value and subset therebetween. In other embodiments, the longest axis is from about 0.05 inches to about 0.2 inches in length. In one embodiment, the substantially non-spherical proppant particulates may be cylindrical and have an aspect ratio of about 1.5 to about 1, and about 0.08 inches in diameter and about 0.12 inches in length. In another embodiment, the substantially non-spherical proppant particulates may be cubic having sides of about 0.08 inches in length. The use of substantially non-spherical proppant particulates may be desirable in some embodiments because, among other things, they may provide a lower rate of settling when slurried into a treatment fluid, or may be better suited for placement in the preexisting and/or new fractures in a subterranean formation to form a proppant pack.

The proppant particulates coated with the silanization composition described herein may, in some embodiments, be introduced into a subterranean formation in a treatment fluid (and in other embodiments may be introduced into the formation in the silanization composition itself). Suitable treatment fluids may include, but are not limited to, oil-based fluids, aqueous-based fluids, aqueous-miscible fluids, water-in-oil emulsions, oil-in-water emulsions, and any combination thereof. Suitable oil-based fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil and oil-in-water emulsions may comprise any water or oil component described herein. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Suitable oil-in-water emulsions may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

Generally, the base fluids forming a portion of the treatment fluids described herein may be present as a dispersion, suspension, colloidal mixture, microemulsion, Pickering emulsion, and any combination thereof. The treatment fluids and/or the silanization composition itself may additionally comprise additives suitable for use with a particular subterranean formation operation. Such suitable additives may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the silanization composition coated proppant particulates or the silanization composition itself (collectively referred to below as simply "silanization composition") described herein to a downhole location are described. In various embodiments, the systems can comprise a pump fluidly coupled to a tubular, the tubular containing the silanization composition described herein.

The pump may be a high pressure pump in some embodiments. As used herein, the term "high pressure pump" will refer to a pump that is capable of delivering a fluid and/or particulates downhole at a pressure of about 1000 psi or greater. A high pressure pump may be used when it is desired to introduce the silanization composition to a subterranean formation at or above a fracture gradient of the subterranean formation, but it may also be used in cases where fracturing is not desired. In some embodiments, the high pressure pump may be capable of fluidly conveying particulate matter, such as coated proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the silanization composition to the high pressure pump. In such embodiments, the low pressure pump may "step up" the pressure of the silanization composition before reaching the high pressure pump.

In some embodiments, the systems described herein can further comprise a mixing tank that is upstream of the pump and in which the silanization composition is formulated. In various embodiments, the pump (e.g., a low pressure pump, a high pressure pump, or a combination thereof) may convey the silanization composition from the mixing tank or other source of the silanization composition to the tubular. In other embodiments, however, the silanization composition may be formulated offsite and transported to a worksite, in which case the silanization composition may be introduced to the tubular via the pump directly from its shipping container (e.g., a truck, a railcar, a barge, or the like) or from a transport pipeline. In either case, the silanization composition may be drawn into the pump, elevated to an appropriate pressure, and then introduced into the tubular for delivery downhole.

FIG. 1 shows an illustrative schematic of a system that can deliver the silanization composition of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the silanization composition of the embodiments herein may be formulated. The silanization composition may be conveyed via line 12 to wellhead 14, where the silanization composition enters tubular 16, tubular 16 extending from wellhead 14 into subterranean formation 18. Upon being ejected from tubular 16, the silanization composition may subsequently penetrate into subterranean formation 18. Pump 20 may be configured to raise the pressure of the silanization composition to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the silanization composition may, in some embodiments, flow back to wellhead 14 and exit subterranean formation 18. In some embodiments, the silanization composition that has flowed back to wellhead 14 may subsequently be recovered and recirculated to subterranean formation 18.

It is also to be recognized that the disclosed silanization composition may also directly or indirectly affect the various downhole equipment and tools that may come into contact with the silanization composition during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A

A method comprising: preparing a silanization composition comprising an aqueous base fluid and an alkyltrialkoxysilane; coating the silanization composition at least partially onto proppant particulates, thereby forming coated proppant particulates, wherein the silanization composition imparts hydrophobicity to the proppant particulates; and introducing the coated proppant particulates into a subterranean formation.

Embodiment A may have one or more of the following additional elements in any combination:

Element A1: Wherein the alkyltrialkoxysilane has the formula $R^1(OR^2)_3Si$, where $R^1$ is a $C_8$ to $C_{22}$ alkyl chain and $R^2$ is an alkyl group selected from the group consisting of methyl, ethyl, butyl, tert-butyl, isopropyl, and any combination thereof.

Element A2: Wherein the alkyltrialkoxysilane is an organosilane selected from the group consisting of hexadecyltrimethoxysilane, isobutyl trimethoxysilane, propyl trimethoxysilane, propyl triethoxysilane, isopropyl trimethoxysilane, isopropyl triethoxysilane, butyl trimethoxysilane, butyl triethoxysilane, isobutyl triethoxysilane, sec butyl trimethoxysilane, sec butyl triethoxysilane, tert butyl trimethoxysilane, tert butyl triethoxysilane, trimethoxysilane, trimethoxymethylsilane, vinyltrimethoxysilane, trimethoxy(3,3,3-trifluoropropyl)silane, allyltrimethoxysilane, (3-bromopropyl)trimethoxysilane, (3-iodopropyl)trimethoxysilane, (3-mercaptopropyl)trimethoxysilane, triethoxysilane, trimethoxy(propyl)silane, (3-aminopropyl)trimethoxysilane, triethoxymethylsilane, trimethoxy[3-(methylamino)propyl]silane, triethoxyvinylsilane, triethoxy(ethyl)silane, [3-(2-aminoethylamino)propyl]trimethoxysilane, N-[3-(trimethoxysilyl)propyl]ethylenediamine, 1,2-bis(trimethoxysilyl)ethane, trimethoxyphenylsilane, allyltriethoxysilane, (3-glycidyloxypropyl)trimethoxysilane, (3-chloropropyl)triethoxysilane, (3-mercaptopropyl)triethoxysilane, n-propyltriethoxysilane, (3-aminopropyl)triethoxysilane, triethoxy-2-thienylsilane, 3-cyanopropyltriethoxysilane, chloromethyltriisopropoxysilane, methyl-tripropoxysilane, [3-(diethylamino)propyl]trimethoxysilane, trimethoxy(2-phenylethyl)silane, trimethoxy[2-(7-oxabicyclo[4.1.0]hept-3-yl)ethyl]silane, cyclopentyltriethoxysilane, trimethoxy(7-octen-1-yl)silane, isooctyl trimethoxysilane, trimethoxy(octyl)silane, (pentafluorophenyl)triethoxysilane, (4-chlorophenyl)triethoxysilane, triethoxyphenylsilane, (3-glycidyloxypropyl)triethoxysilane, (3-chloropropyl)tris(trimethylsiloxy)silane, tetrakis(trimethylsilyloxy)silane, triethoxy-p-tolylsilane, triethoxy(4-methoxyphenyl)silane, 1H,1H,2H,2H-perfluorooctyltriethoxysilane, triethoxy(1-phenylethenyl)silane, triethoxy(octyl)silane, dodecyltriethoxysilane, trimethoxy(octadecyl)silane, n-octadecyltriethoxysilane, methyltris(tri-sec-butoxysilyloxy)silane, and any combination thereof.

Element A3: Wherein the alkyltrialkoxysilane is present in the silanization composition in an amount in the range of from about 0.1% to about 10% by weight of the silanization composition.

Element A4: Wherein the proppant particulates are selected from the group consisting of natural sand, silica, sodium silicate, meta-silicate, calcium silicate, aluminum silicate, ceramic, sintered bauxite, and any combination thereof.

Element A5: Wherein the proppant particulates are pretreated with tetraethylorthosilicate prior to the step of coating the silanization composition at least partially onto proppant particulates.

Element A6: Wherein the coated proppant particulates are introduced into the subterranean formation in the silanization composition.

Element A7: Wherein the coated proppant particulates are introduced into the subterranean formation in a treatment fluid comprising a base fluid selected from the group consisting of an oil-based fluid, an aqueous-based fluid, an aqueous-miscible fluid, a water-in-oil emulsion, an oil-in-water emulsion, and any combination thereof.

Element A8: further comprising a wellhead with a tubular extending therefrom and into the subterranean formation; and a pump fluidly coupled to the tubular, wherein the step of introducing the coated proppant particulates into the subterranean formation comprises introducing the coated proppant particulates through the tubular.

By way of non-limiting example, exemplary combinations applicable to A include: A with A1 and A8; A with A3, A4, and A7; A with A2 and A6; A with A3, A6, and A8; A with A7 and A8; A with A2, A3, and A5.

Embodiment B

A method comprising: preparing a silanization composition comprising an aqueous base fluid and an alkyltrialkoxysilane; coating the silanization composition at least partially onto a subterranean formation, wherein the silanization composition imparts hydrophobicity to the subterranean formation.

Embodiment B may have one or more of the following additional elements in any combination:

Element B1: Wherein the alkyltrialkoxysilane has the formula $R^1(OR^2)_3Si$, where R1 is a $C_8$ to $C_{22}$ alkyl chain and $R^2$ is an alkyl group selected from the group consisting of methyl, ethyl, butyl, tert-butyl, isopropyl, and any combination thereof.

Element B2: Wherein the alkyltrialkoxysilane is an organosilane selected from the group consisting of hexadecyltrimethoxysilane, isobutyl trimethoxysilane, propyl trimethoxysilane, propyl triethoxysilane, isopropyl trimethoxysilane, isopropyl triethoxysilane, butyl trimethoxysilane, butyl triethoxysilane, isobutyl triethoxysilane, sec butyl trimethoxysilane, sec butyl triethoxysilane, tert butyl trimethoxysilane, tert butyl triethoxysilane, trimethoxysilane, trimethoxymethylsilane, vinyltrimethoxysilane, trimethoxy(3,3,3-trifluoropropyl)silane, allyltrimethoxysilane, (3-bromopropyl)trimethoxysilane, (3-iodopropyl)trimethoxysilane, (3-mercaptopropyl)trimethoxysilane, triethoxysilane, trimethoxy(propyl)silane, (3-aminopropyl)trimethoxysilane, triethoxymethylsilane, trimethoxy[3-(methylamino)propyl]silane, triethoxyvinylsilane, triethoxy(ethyl)silane, [3-(2-aminoethylamino)propyl]trimethoxysilane, N-[3-(trimethoxysilyl)propyl]ethylenediamine, 1,2-bis(trimethoxysilyl)ethane, trimethoxyphenylsilane, allyltriethoxysilane, (3-glycidyloxypropyl)trimethoxysilane, (3-chloropropyl)triethoxysilane, (3-mercaptopropyl)triethoxysilane, n-propyltriethoxysilane, (3-aminopropyl)triethoxysilane, triethoxy-2-thienylsilane, 3-cyanopropyltriethoxysilane, chloromethyltriisopropoxysilane, methyl-tripropoxysilane, [3-(diethylamino)propyl]trimethoxysilane, trimethoxy(2-phenylethyl)silane, trimethoxy[2-(7-oxabicyclo[4.1.0]hept-3-yl)ethyl]silane, cyclopentyltriethoxysilane, trimethoxy(7-octen-1-yl)silane, isooctyl trimethoxysilane, trimethoxy(octyl)silane, (pentafluorophenyl)triethoxysilane, (4-chlorophenyl)triethoxysilane, triethoxyphenylsilane, (3-glycidyloxypropyl)triethoxysilane, (3-chloropropyl)tris(trimethylsiloxy)silane, tetrakis(trimethylsilyloxy)silane, triethoxy-p-tolylsilane, triethoxy(4-methoxyphenyl)silane, 1H,1H,2H,2H-perfluorooctyltriethoxysilane, triethoxy(1-phenylethenyl)silane, triethoxy(octyl)silane, dodecyltriethoxysilane, trimethoxy(octadecyl)silane, n-octadecyltriethoxysilane, methyltris(tri-sec-butoxysilyloxy)silane, and any combination thereof.

Element B3: Wherein the alkyltrialkoxysilane is present in the silanization composition in an amount in the range of from about 0.1% to about 10% by weight of the silanization composition.

Element B4: Wherein the step of coating the silanization composition at least partially onto the subterranean formation comprises coating the silanization onto at least a portion of a fracture face in the subterranean formation.

Element B5: Wherein the subterranean formation is pretreated with tetraethylorthosilicate prior to the step of coating the silanization composition at least partially onto the subterranean formation.

Element B6: Wherein the fracture face is formed by introducing the silanization composition into the subterranean formation at a rate and pressure sufficient to create or enhance at least one fracture, and wherein the step of coating the silanization composition onto the fracture face occurs simultaneously with the creation or enhancement of the at least one fracture.

Element B7: Wherein a pad fluid is introduced into the subterranean formation prior to introducing the silanization composition into the subterranean formation, and wherein the pad fluid is introduced at a rate and pressure sufficient to create or enhance at least one fracture to form the fracture face.

Element B8: further comprising a wellhead with a tubular extending therefrom and into the subterranean formation; and a pump fluidly coupled to the tubular, wherein the step of introducing the silanization composition into the subterranean formation comprises introducing the silanization composition through the tubular.

By way of non-limiting example, exemplary combinations applicable to B include: B with B1 and B3; B with B1, B2, and B8; B with B4, B6, and B8; B with B3 and B7; B with B5 and B8; B with B3, B4, and B6.

Embodiment C

A silanization composition comprising: an aqueous base fluid and an alkyltrialkoxysilane, wherein the alkyltrialkoxysilane has the formula $R^1(OR^2)_3Si$, where R1 is a $C_8$ to $C_{22}$ alkyl chain and $R^2$ is an alkyl group selected from the group consisting of methyl, ethyl, butyl, tert-butyl, isopropyl, and any combination thereof, and wherein the silanization composition imparts hydrophobicity when coated at least partially onto a subterranean formation or a proppant particulate.

Embodiment C may have one or more of the following additional elements in any combination:

Element C1: Wherein the alkyltrialkoxysilane is an organosilane selected from the group consisting of hexadecyltrimethoxysilane, isobutyl trimethoxysilane, propyl trimethoxysilane, propyl triethoxysilane, isopropyl trimethoxysilane, isopropyl triethoxysilane, butyl trimethoxysilane, butyl triethoxysilane, isobutyl triethoxysilane, sec butyl trimethoxysilane, sec butyl triethoxysilane, tert butyl trimethoxysilane, tert butyl triethoxysilane, trimethoxysilane, trimethoxymethylsilane, vinyltrimethoxysilane, trimethoxy(3,3,3-trifluoropropyl)silane, allyltrimethoxysilane, (3-bromopropyl)trimethoxysilane, (3-iodopropyl)trimethoxysilane, (3-mercaptopropyl)trimethoxysilane, triethoxysilane, trimethoxy(propyl)silane, (3-aminopropyl)trimethoxysilane, triethoxymethylsilane, trimethoxy[3-(methylamino)propyl]silane, triethoxyvinylsilane, triethoxy(ethyl)silane, [3-(2-aminoethylamino)propyl]trimethoxysilane, N-[3-(trimethoxysilyl)propyl]ethylenediamine, 1,2-bis(trimethoxysilyl)ethane, trimethoxyphenylsilane, allyltriethoxysilane, (3-glycidyloxypropyl)trimethoxysilane, (3-chloropropyl)triethoxysilane, (3-mercaptopropyl)triethoxysilane, n-propyltriethoxysilane, (3-aminopropyl)triethoxysilane, triethoxy-2-thienylsilane, 3-cyanopropyltriethoxysilane, chloromethyltriisopropoxysilane, methyl-tripropoxysilane, [3-(diethylamino)propyl]trimethoxysilane, trimethoxy(2-phenylethyl)silane, trimethoxy[2-(7-oxabicyclo[4.1.0]hept-3-yl)ethyl]silane, cyclopentyltriethoxysilane, trimethoxy(7-octen-1-yl)silane, isooctyl trimethoxysilane, trimethoxy (octyl)silane, (pentafluorophenyl)triethoxysilane, (4-chlorophenyl)triethoxysilane, triethoxyphenylsilane, (3-glycidyloxypropyl)triethoxysilane, (3-chloropropyl)tris (trimethylsiloxy)silane, tetrakis(trimethylsilyloxy)silane, triethoxy-p-tolylsilane, triethoxy(4-methoxyphenyl)silane, 1H,1H,2H,2H-perfluorooctyltriethoxysilane, triethoxy(1-phenylethenyl)silane, triethoxy(octyl)silane, dodecyltriethoxysilane, trimethoxy(octadecyl)silane, n-octadecyltriethoxysilane, methyltris(tri-sec-butoxysilyloxy)silane, and any combination thereof.

Element C2: Wherein the alkyltrialkoxysilane is present in the silanization composition in an amount in the range of from about 0.1% to about 10% by weight of the silanization composition.

By way of non-limiting example, exemplary combinations applicable to C include: C with C1, C with C2, C with C1 and C2.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
preparing a silanization composition comprising an aqueous base fluid and an alkyltrialkoxysilane;
coating the silanization composition at least partially onto proppant particulates, thereby forming coated proppant particulates, wherein the proppant particulates are pretreated with tetraethylorthosilicate prior to the step of coating the silanization composition at least partially onto proppant particulates, and wherein the pretreating facilitates bonding of the silanization composition to the proppant particulates;
wherein the silanization composition imparts hydrophobicity to the proppant particulates; and
introducing the coated proppant particulates into a subterranean formation.

2. The method of claim 1, wherein the alkyltrialkoxysilane has the formula $R^1(OR^2)_3Si$, where $R^1$ is a $C_8$ to $C_{22}$ alkyl chain and $R^2$ is an alkyl group selected from the group consisting of methyl, ethyl, butyl, tert-butyl, isopropyl, and any combination thereof.

3. The method of claim 1, wherein the alkyltrialkoxysilane is an organosilane selected from the group consisting of hexadecyltrimethoxysilane, isobutyl trimethoxysilane, propyl trimethoxysilane, propyl triethoxysilane, isopropyl trimethoxysilane, isopropyl triethoxysilane, butyl trimethoxysilane, butyl triethoxysilane, isobutyl triethoxysilane, sec butyl trimethoxysilane, sec butyl triethoxysilane, tert butyl trimethoxysilane, tert butyl triethoxysilane, trimethoxysilane, trimethoxymethylsilane, vinyltrimethoxysilane, trimethoxy(3,3,3-trifluoropropyl)silane, allyltrimethoxysilane, (3-bromopropyl)trimethoxysilane, (3-iodopropyl)trimethoxysilane, (3-mercaptopropyl)trimethoxysilane, triethoxysilane, trimethoxy(propyl)silane, (3-aminopropyl)trimethoxysilane, triethoxymethylsilane, trimethoxy[3-(methylamino)propyl]silane, triethoxyvinylsilane, triethoxy(ethyl)silane, [3-(2-aminoethylamino)propyl]trimethoxysilane, N-[3-(trimethoxysilyl)propyl]ethylenediamine, 1,2-bis(trimethoxysilyl)ethane, trimethoxyphenylsilane, allyltriethoxysilane, (3-glycidyloxypropyl)trimethoxysilane, (3-chloropropyl)triethoxysilane, (3-mercaptopropyl)triethoxysilane, n-propyltriethoxysilane, (3-aminopropyl)triethoxysilane, triethoxy-2-thienylsilane, 3-cyanopropyltriethoxysilane, chloromethyltriisopropoxysilane, methyl-tripropoxysilane, [3-(diethylamino)propyl]trimethoxysilane, trimethoxy(2-phenylethyl)silane, trimethoxy[2-(7-oxabicyclo[4.1.0]hept-3-yl)ethyl]silane, cyclopentyltriethoxysilane, trimethoxy(7-octen-1-yl)silane, isooctyl trimethoxysilane, trimethoxy(octyl)silane, (pentafluorophenyl)triethoxysilane, (4-chlorophenyl)triethoxysilane, triethoxyphenylsilane, (3-glycidyloxypropyl)triethoxysilane, (3-chloropropyl)tris(trimethylsiloxy)silane, tetrakis(trimethylsilyloxy)silane, triethoxy-p-tolylsilane, triethoxy(4-methoxyphenyl)silane, 1H,1H,2H,2H-perfluorooctyltriethoxysilane, triethoxy(1-phenylethenyl)silane, triethoxy(octyl)silane, dodecyltriethoxysilane, trimethoxy(octadecyl)silane, n-octadecyltriethoxysilane, methyltris(tri-sec-butoxysilyloxy)silane, and any combination thereof.

4. The method of claim 1, wherein the alkyltrialkoxysilane is present in the silanization composition in an amount in the range of from about 0.1% to about 10% by weight of the silanization composition.

5. The method of claim 1, wherein the proppant particulates are selected from the group consisting of natural sand, silica, sodium silicate, meta-silicate, calcium silicate, aluminum silicate, ceramic, sintered bauxite, and any combination thereof.

6. The method of claim 1, wherein the coated proppant particulates are introduced into the subterranean formation in the silanization composition.

7. The method of claim 1, wherein the coated proppant particulates are introduced into the subterranean formation in a treatment fluid comprising a base fluid selected from the group consisting of an oil-based fluid, an aqueous-based fluid, an aqueous-miscible fluid, a water-in-oil emulsion, an oil-in-water emulsion, and any combination thereof.

8. The method of claim 1, further comprising a wellhead with a tubular extending therefrom and into the subterranean formation; and
a pump fluidly coupled to the tubular, wherein the step of introducing the coated proppant particulates into the subterranean formation comprises introducing the coated proppant particulates through the tubular.

9. A method comprising:
preparing a silanization composition comprising an aqueous base fluid and an alkyltrialkoxysilane;
coating the silanization composition at least partially onto a subterranean formation, wherein the subterranean formation is pretreated with tetraethylorthosilicate prior to the step of coating the silanization composition at least partially onto the subterranean formation, and wherein the pretreating facilitates bonding of the silanization composition to the subterranean formation; wherein the silanization composition imparts hydrophobicity to the subterranean formation.

10. The method of claim 9, wherein the step of coating the silanization composition at least partially onto the subterranean formation comprises coating the silanization onto at least a portion of a fracture face in the subterranean formation.

11. The method of claim 9, wherein the alkyltrialkoxysilane has the formula $R^1(OR^2)_3Si$, where $R^1$ is a $C_8$ to $C_{22}$ alkyl chain and $R^2$ is an alkyl group selected from the group consisting of methyl, ethyl, butyl, tert-butyl, isopropyl, and any combination thereof.

12. The method of claim 9, wherein the alkyltrialkoxysilane is an organosilane selected from the group consisting of hexadecyltrimethoxysilane, isobutyl trimethoxysilane, propyl trimethoxysilane, propyl triethoxysilane, isopropyl trimethoxysilane, isopropyl triethoxysilane, butyl trimethoxysilane, butyl triethoxysilane, isobutyl triethoxysilane, sec butyl trimethoxysilane, sec butyl triethoxysilane, tert butyl trimethoxysilane, tert butyl triethoxysilane, trimethoxysilane, trimethoxymethylsilane, vinyltrimethoxysilane, trimethoxy(3,3,3-trifluoropropyl)silane, allyltrimethoxysilane, (3-bromopropyl)trimethoxysilane, (3-iodopropyl)trimethoxysilane, (3-mercaptopropyl)trimethoxysilane, triethoxysilane, trimethoxy(propyl)silane, (3-aminopropyl)trimethoxysilane, triethoxymethylsilane, trimethoxy[3-(methylamino)propyl]silane, triethoxyvinylsilane, triethoxy(ethyl)silane, [3-(2-aminoethylamino)propyl]trimethoxysilane, N-[3-(trimethoxysilyl)propyl]ethylenediamine, 1,2-bis(trimethoxysilyl)ethane, trimethoxyphenylsilane, allyltriethoxysilane, (3-glycidyloxypropyl)trimethoxysilane, (3-chloropropyl)triethoxysilane, (3-mercaptopropyl)triethoxysilane, n-propyltriethoxysilane, (3-aminopropyl)triethoxysilane, triethoxy-2-thienylsilane, 3-cyanopropyltriethoxysilane, chloromethyltriisopropoxysilane, methyl-tripropoxysilane, [3-(diethylamino)propyl]trimethoxysilane, trimethoxy(2-phenylethyl)silane, trimethoxy[2-(7-oxabicyclo[4.1.0]hept-3-yl)ethyl]silane, cyclopentyltriethoxysilane, trimethoxy(7-octen-1-yl)silane, isooctyl trimethoxysilane, trimethoxy(octyl)silane, (pentafluorophenyl)triethoxysilane, (4-chlorophenyl)triethoxysilane, triethoxyphenylsilane, (3-glycidyloxypropyl)triethoxysilane, (3-chloropropyl)tris(trimethylsiloxy)silane, tetrakis(trimethylsilyloxy)silane, triethoxy-p-tolylsilane, triethoxy(4-methoxyphenyl)silane, 1H,1H,2H,2H-perfluorooctyltriethoxysilane, triethoxy(1-phenylethenyl)silane, triethoxy(octyl)silane, dodecyltriethoxysilane, trimethoxy(octadecyl)silane, n-octadecyltriethoxysilane, methyltris(tri-sec-butoxysilyloxy)silane, and any combination thereof.

13. The method of claim 9, wherein the alkyltrialkoxysilane is present in the silanization composition in an amount in the range of from about 0.1% to about 10% by weight of the silanization composition.

14. The method of claim 9, wherein one or more fracture faces are formed by introducing the silanization composition into the subterranean formation at a rate and pressure sufficient to create or enhance one or more fractures each having at least one fracture face, and wherein the step of coating the silanization composition at least partially onto the subterranean formation includes coating the silanization composition at least partially onto the one or more fracture faces simultaneously with the creation or enhancement of the at least one fracture.

15. The method of claim 9, wherein a pad fluid is introduced into the subterranean formation prior to introducing the silanization composition into the subterranean formation, and wherein the pad fluid is introduced at a rate and pressure sufficient to create or enhance at least one fracture having a fracture face.

16. The method of claim 9, further comprising a wellhead with a tubular extending therefrom and into the subterranean formation; and
a pump fluidly coupled to the tubular, wherein the step of introducing the silanization composition into the subterranean formation comprises introducing the silanization composition through the tubular.

17. A silanization composition comprising:
an aqueous base fluid and an alkyltrialkoxysilane,
wherein the alkyltrialkoxysilane has the formula $R^1(OR^2)_3Si$, where $R^1$ is a $C_8$ to $C_{22}$ alkyl chain and $R^2$ is an alkyl group selected from the group consisting of methyl, ethyl, butyl, tert-butyl, isopropyl, and any combination thereof, and
wherein the silanization composition imparts hydrophobicity upon coating at least partially onto a subterranean formation or a proppant particulate, the subterranean formation or proppant particulate having been pretreated with tetraethyl orthosilicate, wherein the tetraethyl orthosilicate facilitates bonding of the silanization composition to the subterranean formation or proppant particulates.

18. The silanization composition of claim 17, wherein the alkyltrialkoxysilane is an organosilane selected from the group consisting of hexadecyltrimethoxysilane, isobutyl trimethoxysilane, propyl trimethoxysilane, propyl triethoxysilane, isopropyl trimethoxysilane, isopropyl triethoxysilane, butyl trimethoxysilane, butyl triethoxysilane, isobutyl triethoxysilane, sec butyl trimethoxysilane, sec butyl triethoxysilane, tert butyl trimethoxysilane, tert butyl triethoxysilane, trimethoxysilane, trimethoxymethylsilane, vinyltrimethoxysilane, trimethoxy(3,3,3-trifluoropropyl)silane, allyltrimethoxysilane, (3-bromopropyl)trimethoxysilane, (3-iodopropyl)trimethoxysilane, (3-mercaptopropyl) trimethoxysilane, triethoxysilane, trimethoxy(propyl)silane, (3-aminopropyl)trimethoxysilane, triethoxymethylsilane, trimethoxy[3-(methylamino)propyl]silane, triethoxyvinylsilane, triethoxy(ethyl)silane, [3-(2-aminoethylamino)propyl] trimethoxysilane, N-[3-(trimethoxysilyl)propyl]ethylenediamine, 1,2-bis(trimethoxysilyl)ethane, trimethoxyphenylsilane, allyltriethoxysilane, (3-glycidyloxypropyl)trimethoxysilane, (3-chloropropyl)triethoxysilane, (3-mercaptopropyl)triethoxysilane, n-propyltriethoxysilane, (3-aminopropyl)triethoxysilane, triethoxy-2-thienylsilane, 3-cyanopropyltriethoxysilane, chloromethyltriisopropoxysilane, methyl-tripropoxysilane, [3-(diethylamino)propyl] trimethoxysilane, trimethoxy(2-phenylethyl)silane, trimethoxy[2-(7-oxabicyclo[4.0.0]hept-3-yl)ethyl]silane, cyclopentyltriethoxysilane, trimethoxy(7-octen-1-yl)silane, isooctyl trimethoxysilane, trimethoxy(octyl)silane, (pentafluorophenyl)triethoxysilane, (4-chlorophenyl)triethoxysilane, triethoxyphenylsilane, (3-glycidyloxypropyl)triethoxysilane, (3-chloropropyl)tris(trimethylsiloxy)silane, tetrakis (trimethylsilyloxy)silane, triethoxy-p-tolylsilane, triethoxy (4-methoxyphenyl)silane, 1H,1H,2H,2H-perfluorooctyltriethoxysilane, triethoxy(1-phenylethenyl) silane, triethoxy(octyl)silane, dodecyltriethoxysilane, trimethoxy(octadecyl)silane, n-octadecyltriethoxysilane, methyltris(tri-sec-butoxysilyloxy)silane, and any combination thereof.

* * * * *